United States Patent [19]

Hasselöf et al.

[11] Patent Number: 4,638,540
[45] Date of Patent: Jan. 27, 1987

[54] METHOD FOR MANUFACTURING RAILWAY WHEELS

[75] Inventors: Åke Hasselöf; Carl-Gustaf Lenasson; Lennart Nordhall, all of Surahammar, Sweden

[73] Assignee: ASEA Aktiebolag, Västerås, Sweden

[21] Appl. No.: 687,759

[22] Filed: Dec. 31, 1984

[30] Foreign Application Priority Data

Jan 3, 1984 [SE] Sweden ............................................. 8400020

[51] Int. Cl.⁴ ............................................. B21H 1/04
[52] U.S. Cl. ........................................ 29/168; 228/186; 228/265; 295/30; 295/31 R
[58] Field of Search ................ 29/168, 803; 295/30, 295/31 R, 34; 228/186, 265, 190, 178

[56] References Cited

U.S. PATENT DOCUMENTS

| 4,673 | 7/1846 | Saunders et al. | 295/34 |
| 547,096 | 10/1895 | Taylor | 295/30 |
| 1,959,068 | 5/1934 | Stoll | 228/265 |
| 2,030,243 | 2/1936 | Corts | 295/31 R |
| 4,152,816 | 5/1979 | Ewing et al. | 228/186 |

FOREIGN PATENT DOCUMENTS

| 1152127 | 3/1958 | Fed. Rep. of Germany | 295/31 R |
| 61060 | 5/1979 | Japan | 228/186 |
| 26175 | of 1909 | United Kingdom | 295/30 |

Primary Examiner—Howard N. Goldberg
Assistant Examiner—P. W. Echols
Attorney, Agent, or Firm—Watson, Cole, Grindle & Watson

[57] ABSTRACT

A method for manufacturing a railway wheel with a base material, a more wear-resistant layer at the part of the flange facing the wheel tread, and a layer in the tread which gives a high friction between wheel and rail which is relatively independent of the weather. The method is characterized in that a prefabricated component is manufactured from members of the base material and from the more wear-resistant materials, respectively, which members are given such a shape as to fit closely against each other, and which, after turning or other machining and cleaning from oxide and other impurities, are put together and welded together at the outer surfaces of the component in such a way that admission of air between said members is prevented, the component thereafter being hot-worked to form a finished or near finished wheel blank with a good bond between the different members defining the tread and/or flange regions thereof.

9 Claims, 4 Drawing Figures

METHOD FOR MANUFACTURING RAILWAY WHEELS

BACKGROUND OF THE INVENTION

The present invention relates to a method for the manufacture of flanged rail-engaging wheels (e.g. steel railway wheels or steel tires for such wheels) from a base metallic material, the wheels including a more wear-resistant layer on the exposed face of that part of the flange facing the wheel tread and/or an outer layer over the tread, thus providing an enhanced frictional engagement between the wheel and the rail that is relatively independent of the weather.

It is a desirable aim in the production of a flanged wheel for a wheel-on-rail wheeled transport system to have a wheel which, in any weather condition, provides good frictional engagement between the wheel and the rail and which has optimum wear resistant properties in the wear-critical region of the flange.

The method of the invention permits railway and like flanged wheels to be manufactured in an economical manner which have, at the side of the flange facing the wheel tread, an exposed layer which is more wear-resistant than the base material and desirably also has a lower frictional resistance with the rail than the base material. Alternatively, or simultaneously, the method of the invention allows the wheel to be provided with a layer exposed at the wheel tread which has a higher frictional resistance with the rail than the base material, which is desirable from the point of view of good driving traction and optionally also is more wear-resistant than the base material.

As examples of materials which can be used for the flange and tread regions may be mentioned, for the flange region, a highly carbonaceous martensitic steel and for the tread region, a martensitic steel with a carbon content of about 0.05%.

SUMMARY OF THE INVENTION

The method according to the invention provides an answer to the above-mentioned desiderata. What characterizes the invention is a manufacturing method which comprises forming a disk-shaped member of a first metallic base material for the wheel provided with a peripheral recess, forming a ring of a second metallic material having mechanical properties making it more suitable for a rail-engaging region of the wheel than the base material, locating the ring in the recess to provide good contact between the first and second materials at least over confronting surfaces which end in a surface of the disk-shaped member, welding the first and second materials together along the ends of the confronting surfaces to prevent the admission of air between the confronting surfaces, and hot working the now composite disk-shaped member to form the wheel with the second material providing at least part of the rail-engaging surface of the wheel.

Suitably two rings are located side-by-side in the recess, a first ring being of a metallic material having a higher coefficient of friction with the rail than the base material and a second ring being of a metallic material having greater wear resistance than the base material, the rings being welded to each other and each to the base material, the hot-working step leaving the first ring defining a tread region of the wheel and the second ring defining that part of the flange of the wheel that faces the tread region.

It is important that each member/ring contacting surface is clear of oxide or other surface-contaminating impurities and if present, these should be removed before the disk-shaped member and ring(s) are put together and welded at the outer surfaces in such a way that admission of air between the member/ring(s) is prevented. After fabricating the composite disk-shaped member, the latter is hot-worked (in conventional manner) into a finished or near finished shape with a good bond between the base material and the ring material(s).

BRIEF DESCRIPTION OF THE DRAWING

The method of the invention will now be further described, by way of example, with reference to the accompanying drawing, in which.

DESCRIPTION OF PREFERRED EMBODIMENTS

Figure 1:
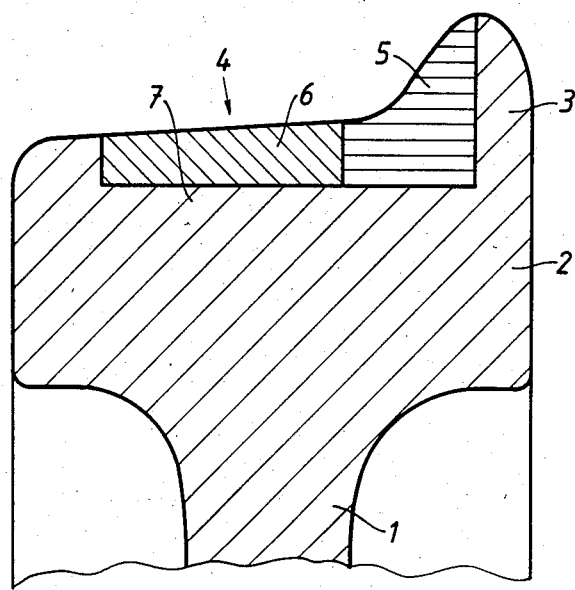
FIG. 1 shows in cross-section part of a wheel manufactured by means of the method according to the invention.

FIG. 1 shows a solid wheel for railway operation, but the invention can also be applied to steel tires for composite railway wheels. 1 designates the web region of the wheel and 2 designates the tire region 3 is the flange of the wheel and 4 is the rail-engaging tread of the wheel. It is desirable that the part of the flange 3 facing the tread 4, be provided with a layer 5 which has (a) a higher wear resistance than the base material 7 used for most of the wheel, and (b) a lower coefficient of friction with the rail than the base material 7. At the same time as this layer 5 is provided, or possibly as an alternative thereto, a layer 6 is desirable at the exposed surface of the tread 4, which layer 6 gives a higher frictional resistance between the wheel and the rail than the base material, for obtaining enhanced traction with the railway wheel and optionally also an improved wear resistance. The materials which may be used for the two layers 5 and 6 are exemplified above. Suitably, a highly carbonaceous martensitic steel is used for the flange layer 5 and a martensitic steel with a carbon content of about 0.05% for the tread layer 6.

Figure 2:
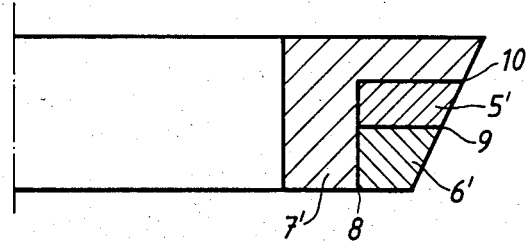
FIG. 2 shows part of a composite disk-shaped member from which the wheel of FIG. 1 has been forged.
Figure 3:
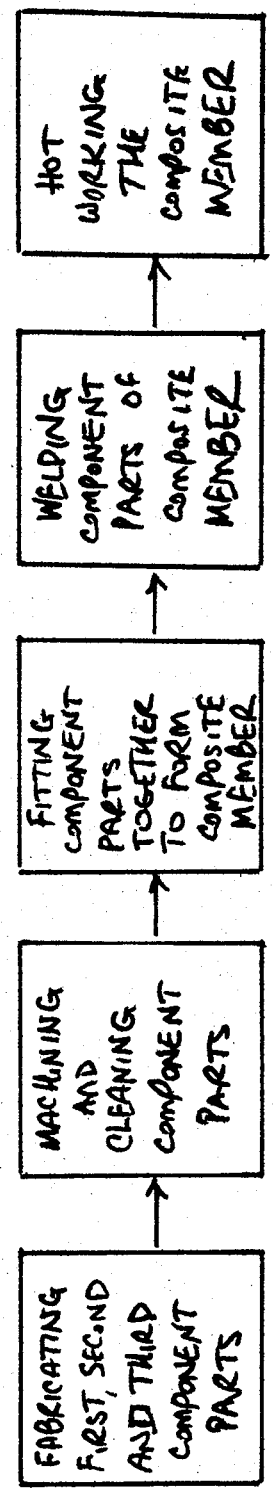
FIG. 3 is a block diagram of the steps of the inventive method according to one preferred embodiment.
Figure 4:
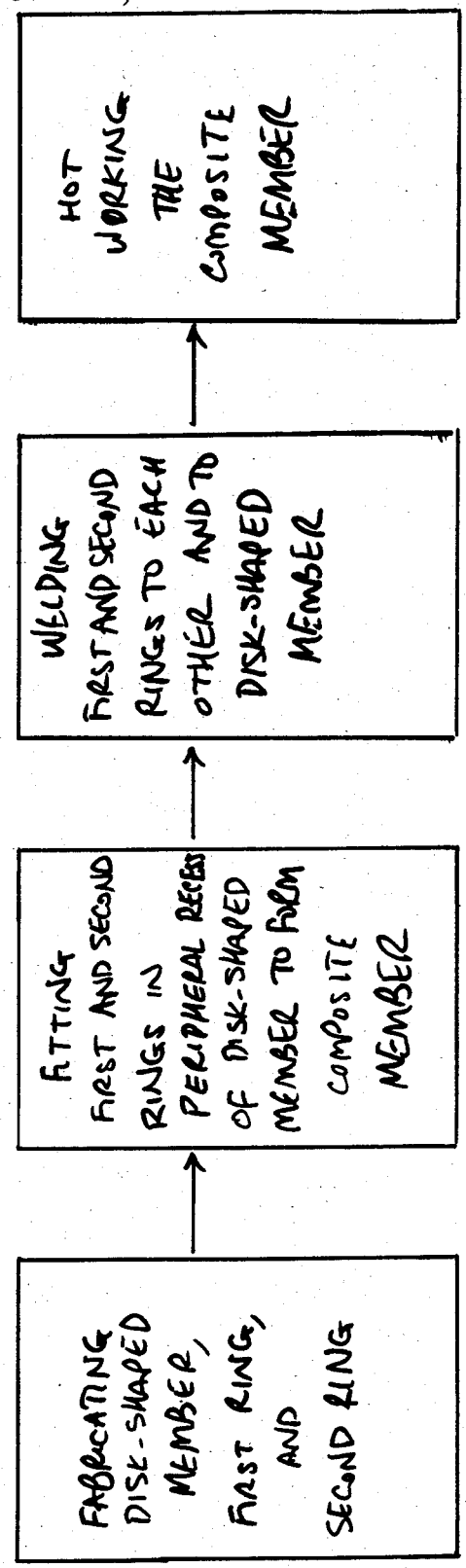
FIG. 4 is a block diagram of the steps of the inventive method according to another preferred embodiment.

The three component wheel shown in FIG. 1 may be made as follows. A three-part component (shown in FIG. 2) is prefabricated from a disk-like member 7' of base steel material and from two rings 5', 6' from the other materials, which are to make the flange region 5 and the tread region 6, respectively. The different members 7', 5', 6' are made so as to fit closely against each other, and a precise fit can be obtained by turning the members and by ensuring that the confronting surfaces are free of oxides and other organic impurities. An impurity-free surface can be ensured in the usual way by resorting to grinding, planing, polishing and/or by use of chemical cleaners. The members 7', 5', 6' are then assembled together as shown in FIG. 2, whereafter they are welded together along the outer joints 8, 9, 10, in a vacuum, for example by means of electron beam welding. In this way admission of air between the layers 7', 5':7', 6' and 5', 6' can be prevented in the subsequent hot working operation to shape the wheel from the prefabricated component.

After welding, the composite of FIG. 2 is heated, forged and rolled so that all three parts are subjected to a proper hot-working. After the hot-working operation the different members have a good metallic bond to each other.

Although welding in vacuum is preferred it is possible to weld in a protective gas atmosphere, e.g., one of nitrogen or argon.

After the manufacture as described above, the member is subjected to the normal procedures to turn it into a finished product, for example turning with subsequent finishing.

Although both layers 5 and 6 are deemed to be desirable in a composite railway wheel, some improvement can be obtained if just one ring 5' or 6' is used in the component of FIG. 2.

The method of the invention results in a wheel blank, which can easily be hot-worked (sintered and rolled) and/or further machined (turned) to produce the desired finished product.

The method described above with reference to the drawing can be varied in many ways within the scope of the appended claims. Thus, the thickness of the prefabricated members 5', 6' can be varied in many ways—provided a sufficient thickness for the finished layers in the flange region 5 and the tread region 6, is obtained.

What is claimed is:

1. A method for making a near-finished wheel blank for use in manufacturing a railway wheel which has a base region, a flange region and a tread region, said flange region being divided into first and second portions and said tread region being divided into first and second portions, the second portion of said flange region abutting the first portion of said tread region, said base region and said first portion of said flange region being made of a first material, at least said second portion of said flange region being made of a second material which is more wear-resistant than said first material, and said second portion of said tread region being made of a third material which has a higher frictional resistance than said first material, said method including the steps of
    (1) fabricating (a) a first component part from said first material which is shaped to form said base region and said first portion of said flange region, (b) a second component part from said second material which is shaped to form at least said second portion of said flange region, and (c) a third component part from said third material which is shaped to form said second portion of said tread region, said first, second and third component parts being shaped to fit closely against each other,
    (2) machining and cleaning each of said first, second and third component parts to remove impurities therefrom,
    (3) fitting together said first, second and third component parts so as to form a composite member,
    (4) welding said first, second and third component parts together along their abutting edges which are exposed such that air cannot enter said composite member between said component parts, and
    (5) hot-working said composite member to provide a good bond between said first, second and third component parts and to provide said near-finished wheel blank.

2. A method according to claim 1, in which the welding in step (4) is performed in a vacuum.

3. A method according to claim 2, in which the welding in step (4) is by electron beam welding.

4. A method according to claim 1, in which the welding in step (4) is effected in an atmosphere of a protective gas.

5. A method according to claim 4, in which the protective gas is selected from nitrogen and argon.

6. A method as defined in claim 1, wherein in step (1) said second component part is fabricated to form said second portion of said flange region and said first portion of said tread region.

7. A method of manufacturing a wheel which has a base region, a flange region and a tread region, said flange region being divided into first and second portions and said tread region being divided into first and second portions, the second portion of said flange region abutting the first portion of said tread region, said base region and said first portion of said flange region being made of a first material, at least said second portion of said flange region being made of a second material which is more wear-resistant than said first material, and said second portion of said tread region being made of a third material which has a higher frictional resistance than said first material, said method including the steps of
    (1) fabricating (a) a disk-shaped member from said first material which is shaped to have a peripheral recess said disk-shaped member forming said base region and said first portion of said flange region, (b) a first ring from said second material which is shaped to form at least said second portion of said flange region, and (c) a second ring from said third material which is shaped to form said second portion of said tread region, said first and second rings being shaped to fit closely against each other and against said peripheral recess of said disk-shaped member.
    (2) fitting said first and second rings in the peripheral recess of said disk-shaped member so as to form a composite member,
    (3) welding said first and second rings together along their abutting edges which are exposed and to said disk-shaped member such that air cannot enter said composite member between said rings, and
    (4) hot-working said composite member to provide a good bond between said first and second rings and between said ring and said disk-shaped member to provide said wheel.

8. A method according to claim 7, in which the first ring is of a martensitic steel with a carbon content of about 0.05% and the second ring is of martensitic steel with a much higher carbon content.

9. A method according to claim 7, in which the welding in step (3) is performed in a vacuum.

* * * * *